Sept. 22, 1970   A. BURLESON   3,529,329
FASTENER FOR WELT LOOP HOSE
Filed Nov. 22, 1968
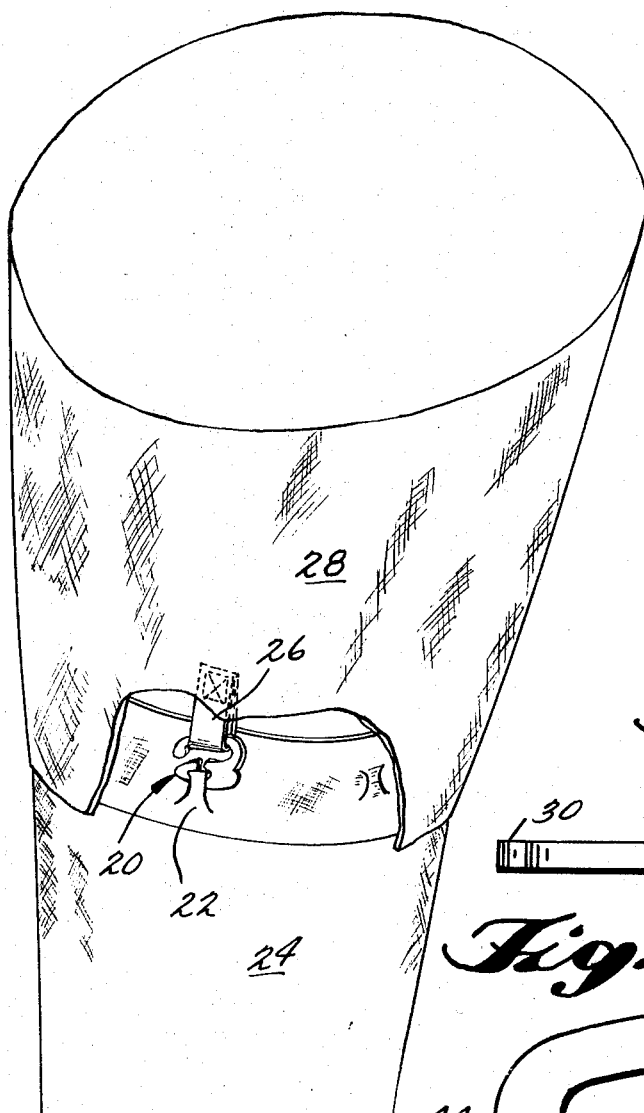
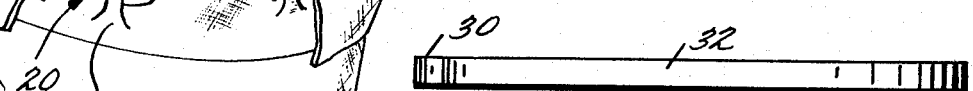
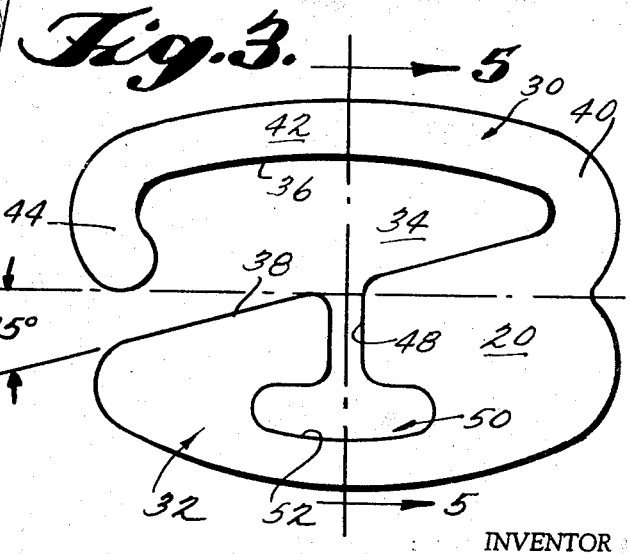
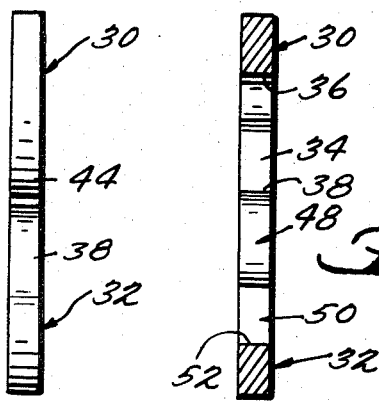
INVENTOR
AARON BURLESON
BY Cushman, Darby & Cushman
ATTORNEYS United States Patent Office 3,529,329
Patented Sept. 22, 1970

3,529,329
FASTENER FOR WELT LOOP HOSE
Aaron Burleson, Burlington, N.C., assignor to Burlington Industries, Inc., Greensboro, N.C., a corporation of Delaware
Filed Nov. 22, 1968, Ser. No. 778,138
Int. Cl. A44b 11/00; A41b 11/00
U.S. Cl. 24—200                                                  4 Claims

ABSTRACT OF THE DISCLOSURE

A fastener for coupling hose having integrally knit narrow welt loops thereon to support garments having conventional width elastic or nylon loops comprises a thin plate having upper and lower arms joined at one end and defining therebetween a slot. The upper arm has a hook at its free end and defines a loop retaining portion having the width of a conventional loop presently used on support garments. The lower arm is provided with an inverted substantially T-shaped slot having a narrow loop retaining portion to maintain stocking welt loops in alignment with the vertical center line of the fastener and prevent the cocking or tilting of the fastener which can cause detachment of the fastener from the support garment and having a narrow passageway centrally aligned with respect to the loop retaining portion for allowing the passage of a narrow welt loop into the slot while preventing the loop from accidentally slipping out of the slot when in use.

BRIEF DESCRIPTION OF THE INVENTION

The invention relates to fasteners for securing hose to girdles and other forms of support garments and, in particular, to an improved fastener for securing narrow integrally knit welt loops on stockings and the like to loops of conventional width on support garments and the like.

Heretofore, attempts to secure hose having narrow welt loops such as the loops disclosed in my copending application, Ser. No. 742,082, entitled, "Detachable Hose With Knitted Fabric Loops," and filed on July 2, 1968 (the disclosure of which is incorporated herein by reference) to conventional loops on girdles and similar supporting garments by conventional fastener means such as the hook coupling disclosed in the patent to Moffatt, No. 2,140,164, issued Dec. 13, 1938, has presented problems which make the use of such hook couplings for securing this type of hose to support garments very impractical. Hook couplings, such as the one disclosed by Moffatt, are suited for use when the loops being joined are both of conventional width and wherein a constant tension is applied to the straps. When using such a hook coupling to secure hose with narrow welt loops to support garments having loops of a conventional width, it was found that during normal wear, these fasteners proved highly unsatisfactory. With the configuration of slot 19 of the Moffatt fastener, the narrow loops of the hose eventually work their way to one end of the slot or the other thereby cocking the hook coupling with respect to the upper loop due to the downward pull exerted on the hook coupling by the welt loop which is no longer centered but off to one side.

As can be readily seen, when the narrow loop on the stocking welt works its way to one end of the slot 19 of the Moffatt fastener or similar fasteners, the downward force exerted on the coupling cocks the coupling in such a manner that the coupling can become easily detached from the loop on the support garment. In addition, with the loop at this end of the slot, a relaxing in the tension on the lower stocking loop caused by the movement of the wearer, such as when standing, sitting, crossing legs or other common movements, not only permits the Moffatt fastener to become detached from the girdle loop, but permits the narrow loop on the welt to work its way up into the offset entrance slot whereby the narrow welt loop could work its way free or the fastener is maintained in the cocked position until the upper arm becomes disengaged from the loop on the support garment.

If the narrow loop should work its way to the other end of the slot on fasteners similar to the Moffatt fastener, the fastener becomes locked very tightly between the upper and lower loops making the intentional detachment of the hose from the girdle more difficult and also causing a possible gathering of the wider upper loop due to the configuration of the slot. Such a gathering of the loop on the support garment can cause discomfort to the wearer especially when the loop is under an elastic leg portion of supporting garment wherein the edges of the gathered loop can cause irritation to the skin of the wearer.

The above problems and disadvantages encountered when using the hook couplings of the prior art for joining narrow welt loops to support garment loops of conventional width are solved by the present invention which comprises a novel means for securing hose with narrow welt loops to girdles having conventional loops thereon. The present invention provides a means for maintaining a downward thrust on the fastener which is centered with respect to the fastener along the vertical center line of the fastener to prevent any cocking of the fastener which results in the above-discussed problems and also provides a passageway for slipping the narrow welt loop into or out of the loop retaining portion of the fastener whereby due to the inclination and relative position of the passageway with regard to the end portions of the retaining slot, the loop will not become accidentally disconnected or caught in the passageway.

Briefly, the present invention comprises a thin plate having upper and lower arms which are joined at one end with one arm being adapted to retain a loop of conventional width and construction and the other arm being adapted to retain a narrow welt loop of a stocking. The upper arm has an arcuate portion extending away from the juncture with a lower arm, an intermediate portion extending at substantially right angles to the arcuate portion and having a concave surface facing the lower arm, and a second substantially arcuate portion at its free end extending from the intermediate portion toward the lower arm to prevent the loop of the support garment from sliding off the arm.

The lower arm has an inclined surface facing the upper arm and is provided with an inverted T-shaped slot located substantially along the vertical center line of the fastener. The loop retaining portion of the slot is substantially half the width of the upper loop retaining portion on the upper arm and is shaped to maintain the welt loop of the stocking in alignment with the vertical center line of the fastener to prevent cocking of the fastener due to the application of force on the fastener other than along the vertical center line. Furthermore, the centrally-located entrance portion of the slot, which is oriented at right angles with respect to the loop retaining portion of the slot, prevents the loop from accidentally becoming disengaged with respect to the slot.

The above-mentioned objects and advantages will become more apparent and other objects and advantages of the present invention will become apparent from the following detailed description when taken in conjunction with the accompanying drawing in which:

FIG. 1 is a fragmentary perspective view illustrating the manner in which the fastener secures a stocking with narrow welt loops to a support garment having conventional support loops;

FIG. 2 is a bottom plan view of the fastener element;

FIG. 3 is a front elevational view of the fastener element;

FIG. 4 is a side elevational view of the left side of the fastener element as shown in FIG. 3 and illustrating the slot formed between the upper and lower arms of the fastener to permit entry of the garment loops; and FIG. 5 is a sectional view of the fastener taken substantially along lines 5—5 of FIG. 3.

DETAILED DESCRIPTION OF THE INVENTION

Referring now to the drawings and, in particular, to FIG. 1, which exemplifies the manner in which the fastener 20 of the present invention is utilized to interconnect the narrow welt loop 22 (approximately .25 inch wide) of a stocking 24 to a loop 26 of conventional width (approximately .50 inch wide) on a support garment. While FIGS. 1 through 5 and the detailed disclosure set forth the preferred form and dimensions of the invention and the mode of carrying out the preferred form of the invention, it is to be understood that modifications and equivalents of the illustrated embodiment can be resorted to which fall within the scope of the invention.

As best shown in FIGS. 2 through 5, the fastener 20 comprises a thin flat plate, .50 inch in height by approximately .75 inch in width and .035 inch in thickness. In the preferred form, the plate is metallic (steel) and has a protective enamel coating on its entire surface. Of course, it is contemplated that the fastener can be made of other materials including plastic and that other suitable protective coatings can be used if desired.

The fastener 20 is made up of upper and lower arms 30, 32 which merge together at one end to form an integral fastener. Both arms extend from their common juncture in a substantially horizontal direction with the free ends of the arms forming an entrance slot through which the hose and girdle loops pass when being inserted into or removed from a slot 34 defined by the opposing edges 36, 38 of the upper and lower arms 30, 32 of the fastener.

Upper arm 30 has an arcuate portion 40 extending away from the juncture of the upper arm with the lower arm in a generally vertical direction. Extending at substantially right angles to the arcuate portion 40 is an intermediate portion 42 which is .562 inch in length. The inner edge 36 of intermediate portion 42 faces the lower arm 32 and has a radius of curvature of .864 inch to maintain the loop 26 of the support garment centered with respect to the vertical center line of the fastener and prevent the tilting of the fastener to one side or the other. Extending at substantially right angles to the intermediate portion is the free end of the upper arm 30 which extends toward the lower arm 32. The free end portion of the arm is substantially arcuate in configuration and forms a hook or stop 44 with an inner concave surface which prevents the support garment loop from becoming accidentally disengaged from the fastener. The outer edge 46 of the free end, as well as the inner edge, is rounded to prevent the support garment loop from snagging on the hook 44. The above structure results in a loop retaining slot having a width of approximately .562 inch with rounded end portions and a concave intermediate edge 36 which prevents the snagging or fraying of the support garment loop 26 and retains garment loop 26 in alignment with the vertical center line of the fastener 20.

The lower arm 32 is of substantially greater width than the upper arm 30 at their juncture and is tapered from its juncture with the upper arm to its free end. The upper edge 38 of the arm is inclined at an angle of 15° with respect to the horizontal center line of the fastener so as to form an entrance slot of .075 inch between the upper edge 38 of the lower arm 32 and the lower edge portion of the hook 44 on the upper arm to permit the passage of loops 22, 26 into or out of the fastener 20 when attaching or detaching hose 24 from the supporting garment 28.

An inverted, substantially T-shaped slot interrupts the inclined upper edge 38 of the lower arm of the fastener. This slot is substantially symmetrical with regard to the vertical center line of the fastener 20 and comprises an entrance portion 48 having a width of .04 inch which is defined by substantially vertically-extending sidewalls and a loop retaining portion 50 oriented at right angles with respect to the entrance portion and having a width of approximately .24 inch. The entrance portion 48 of the slot intersects the loop retaining portion 50 midway between the ends of the loop retaining portion of the slot to prevent the side edges of loop 22 from protuding into the entrance slot once the loop has passed into the retaining portion of the slot. The loop retaining portion 50 of the the slot has a lower wall 52 which is concave, having a radius of curvature of .431 inch, to help maintain the narrow welt loop centered with respect to the fastener and the edges of the inverted T-shaped slot are rounded to prevent the snagging or fraying of the narrow welt loop 22 on the corners of the inverted T-shaped slot.

In use, the narrow welt loop 22 is inserted between the upper and lower arms 30 and 32 of the fastener and through the entrance portion 48 of the inverted T-shaped slot into the loop retaining portion 50 thereby securely connecting the fastener to the welt loop 22 of the hose The upper arm 30 of the fastener is then inserted through the loop 26 on the support garment thereby securely coupling the hose to the support garment. Due to the unique configuration of the inverted T-shaped slot, which has a width substantially equal to the width of the narrow welt loop on the hose, and the orientation of the inverted T-shaped slot with respect to the vertical center line of the fastener 20, the downward force exerted on the fastener by the welt loop 22 is directed substantially along the vertical center line of the fastener thereby preventing the fastener from tilting and either becoming disconnected from the upper loop 26 or gathering in the upper loop 26 to cause discomfort to the wearer. In addition, the positioning of the entrance portion 48 of the inverted T-shaped slot midway between the ends of the loop retaining portion 50 with the right angle orientation of the repective portions of the slot prevents the welt loop 22 from working its way up into the entrance portion of the slot to insure that the narrow welt loop remains centered within the slot even though the movements of the wearer cause a variation in the tension exerted on the fastener 20 by the loops.

Although for the purposes of illustration only one fastener has been shown in FIG. 1, obviously a plurality of fasteners are used to interconnect pairs of loops on the support garment and hose. The exact numper of coupling arrangements between the hose and the support garment will vary according to the requirements of the particular hose and support garment.

While the preferred form of the invention has been shown and described, it is to be understood that all suitable modifications and equivalents can be resorted to which fall within the scope of the invention.

What is claimed is:

1. A fastener for coupling welt loop hose having narrow loops to support garments having conventional loops substantially twice the width of the narrow loops comprising:
   a thin plate having an upper arm and a lower arm, said upper and lower arms each having first and second ends, said upper and lower arms being integral and extending outwardly from a juncture formed by the merging of said first ends of said upper and lower arms;
   said upper arm having an arcuate portion at said first end extending away from said juncture and said lower arm, an intermediate portion extending substantially at right angles with respect to said arcuate portion and having a concave edge facing said lower arm, and an arcuate portion at said second end extending from said intermediate portion toward said lower arm at substantially right angles with respect to said intermediate portion, inner edges of said arcuate portions and said concave edge of said intermediaate portion defining a first loop retaining portion;

said lower arm being tapered from said first end to said second end and extending in substantially the same direction as said intermediat portion, said lower arm having an inclined edge facing said concave edge of said upper arm with said inclined edge diverging with respect to said concave edge of said upper arm from said first end to said second end of said lower arm, said inclined edge being interrupted by an inverted T-shaped slot which is substantially symmetrical with respect to said vertical center line of the fastener, said T-shaped slot having an entry portion defined by edges of said lower arm extending parallel to said vertical center line of the fastener and a loop retaining portion defined by edges extending substantially perpendicular to said vertical center line of the fastener, said loop retaining portion of said inverted T-shaped slot having a width substantially less than the width of the loop retaining portion of said upper arm and a concave edge for engaging a loop to insure that a narrow loop on a hose will remain centered with respect to the fastener and exert a downward force substantially along the vertical center line to prevent the tilting of the fastener and the possible detachment of the fastener from a supporting loop.

2. In the fastener of claim 1, said loop retaining portion of said inverted T-shaped slot being substantially half as wide as the loop retaining portion of said upper arm.

3. In the fastener of claim 1, said loop retaining portion of said inverted T-shaped slot being substantially .25 inch in width and said loop retaining portion of said upper arm being substantially .50 inch in width.

4. Detachable panty hose comprising:
a support garment having loops thereon for supporting fastener means;
hose having narrow loops thereon substantially half the width of said loops on said support garment for coupling said hose to fastener means;
fastener means coupling said loops of said hose to said loops of said support garment, each of said fastener means comprising a thin plate having an upper arm and a lower arm, said upper and lower arms each having first and second ends, said upper and lower arms being integral and extending outwardly from a juncture formed by the merging of said first ends of said upper and lower arms; said upper arm having an arcuate portion at said first end extending away from said juncture and said lower arm, an intermediate portion extending substantially at right angles with respect to said arcuate portion and having a concave edge facing said lower arm, and an arcuate portion at said second end extending from said intermediate portion toward said lower arm at substantially right angles with respect to said intermediate portion, inner edges of said arcuate portions and said concave edge of said intermediate portion defining a first loop retaining portion which retains one of said loops of said support garment; said lower arm being tapered from said first end to said second end and extending in substantially the same direction as said intermediate portion, said lower arm having an inclined edge facing said concave edge of said upper arm with said inclined edge diverging with respect to said concave edge of said upper arm from said first end to said second end of said lower arm, said inclined edge being interrupted by an inverted T-shaped slot which is substantially symmetrical with respect to said vertical center line of the fastener, said T-shaped slot having an entry portion defined by edges of said lower arm extending parallel to said vertical center line of the fastener and a loop retaining portion defined by edges extending substantially perpendicular to said vertical center line of the fastener, said loop retaining portion of said inverted T-shaped slot having a width substantially less than the width of the loop retaining portion of said upper arm and a concave edge engaging one of said loops of said hose to insure that said narrow loops on said hose will remain centered with respect to the fastener and exert a downward force substantially along the vertical center line of the fastener to prevent the tilting of the fastener and the possible detachment of the fastener from said supporting garment.

References Cited

UNITED STATES PATENTS

| | | | |
|---|---|---|---|
| D.162,932 | 0/1951 | Burnham | 24—264 XR |
| 2,140,164 | 12/1938 | Moffatt | 24—199 |
| 2,149,149 | 2/1939 | Scheinberg | 128—535 |
| 2,473,209 | 6/1949 | Lombardi | 24—200 XR |
| 2,586,159 | 2/1952 | Grishman | 24—200 |

FOREIGN PATENTS 1,431,883  2/1966  France.

DONALD A. GRIFFIN, Primary Examiner

U.S. Cl. X.R.

2—240; 128—535